United States Patent [19]

Ishiguro et al.

[11] Patent Number: 4,465,936
[45] Date of Patent: Aug. 14, 1984

[54] COMPLEX PERSONAL DOSIMETER

[75] Inventors: Hideharu Ishiguro; Shinso Takeda; Yukihiro Nomura, all of Ibaraki; Yoshitake Yasuno, Kyoto, all of Japan

[73] Assignees: Doryokuro Kakunenryo Kaihatsu Jigyodan, Tokyo; Matsushita Electric Industrial Co., Ltd., Osaka, both of Japan

[21] Appl. No.: 381,908

[22] Filed: May 25, 1982

[30] Foreign Application Priority Data

Jun. 11, 1981 [JP] Japan ............... 56-85747[U]

[51] Int. Cl.³ .............................................. G01T 1/11
[52] U.S. Cl. ................... 250/484.1; 250/486.1
[58] Field of Search .......... 250/482.1, 484.1, 486.1, 250/390, 337

[56] References Cited

U.S. PATENT DOCUMENTS

| | | | |
|---|---|---|---|
| 3,761,710 | 9/1973 | Yamashita et al. | 250/484.1 |
| 3,883,748 | 5/1975 | Nada et al. | 250/484.1 |
| 3,911,283 | 10/1975 | Williams | 250/390 |
| 4,286,165 | 8/1981 | Jones et al. | 250/484.1 |
| 4,290,909 | 9/1981 | Takenaga et al. | 250/484.1 |

Primary Examiner—Alfred E. Smith
Assistant Examiner—Carolyn E. Fields
Attorney, Agent, or Firm—Wenderoth, Lind & Ponack

[57] ABSTRACT

A complex personal dosimeter including a gamma- and beta-ray dosimeter block and a neutron dosimeter block. These two blocks are enclosed in a badge case type package so that a person can secure the dosimeter on his clothing. The gamma- and beta-ray dosimeter block consists of four thermoluminescent elements in combination with plastic filters having different thickness. The neutron dosimeter block consists of four thermoluminescent elements in combination with cadmium and tin filters. This complex dosimeter can individually measure or estimate the radiation doses such as gamma-rays, beta-rays, thermal neutrons, epithermal neutrons and fast neutrons over a wide range of doses, and can also obtain information on the energy of the radiation.

11 Claims, 5 Drawing Figures

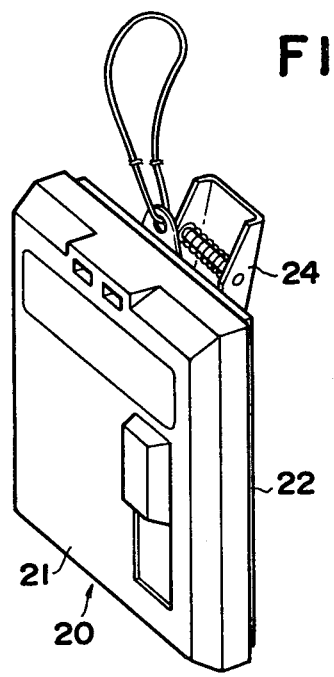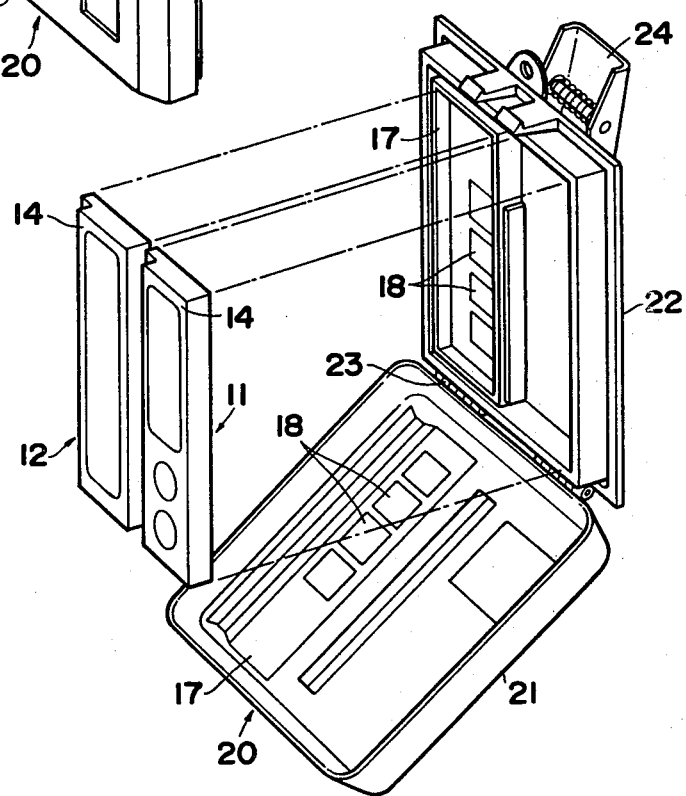

FIG. 3
FIG. 4
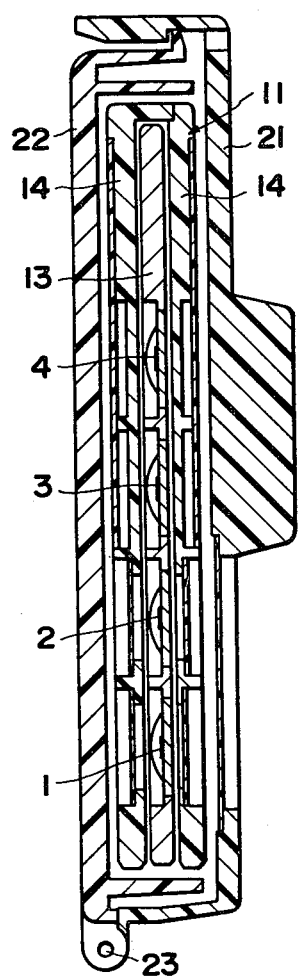
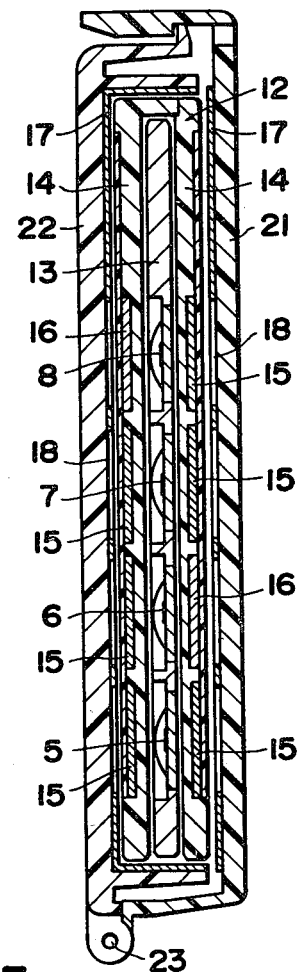
FIG. 5
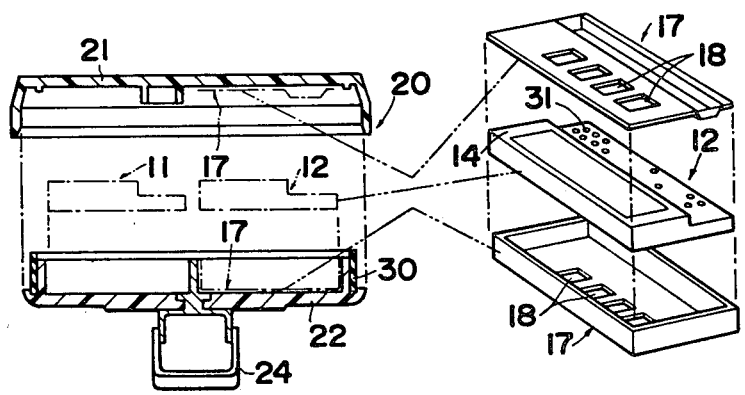

COMPLEX PERSONAL DOSIMETER

BACKGROUND OF THE INVENTION

This invention relates to a dosimeter capable of measuring the doses of various radiations separately, and more particularly it relates to a complex personal dosimeter comprising a total of eight thermoluminescence dosimeter elements enclosed in a single badge case to provide individual measurements of the respective radiation doses.

A personal dosimeter is an instrument for measuring the dosage of radiation to which a person has been exposed. There are many known types of radiation dosimeters using various detection means, but among them, those making use of thermoluminescent elements have been widely employed recently because of their many advantages such as small size, light weight and high sensitivity to radiation. Various mechanisms for such thermoluminescence dosimeters for personal use have been proposed.

For example, U.S. Pat. No. 3,761,710 discloses a complex thermoluminescence dosimeter capable of measuring gamma-rays, X-rays, beta-rays and thermal neutrons in a complex radiation field. Further, Japanese Utility Model Publication 55-29104 (published on July 11, 1980) discloses a dosimeter for neutron rays capable of separately measuring the doses of thermal neutron rays, epithermal neutron rays and fast neutron rays using thermoluminescent elements in combination with cadmium and tin filters.

However, the conventional personal dosimeters are not satisfactory in such respects as quickness and accuracy of measurement or estimation, and thus further efforts for improvement are desirable.

SUMMARY OF THE INVENTION

An object of this invention is to provide an improved complex personal dosimeter which, by improving to the prior art techniques and by making best use of the advantages of the thermoluminescence dosimeter, is capable of individually measuring or estimating the doses of radiation such as gamma-rays, beta-rays, thermal neutrons, epithermal neutrons and fast neutrons over a wide range of doses quickly and accurately, and is also capable of obtaining information on the energy of the radiation to which a person has been exposed.

According to the present invention, there is provided a complex personal dosimeter including a gamma- and beta-ray dosimeter block and a neutron dosimeter block. These two blocks are enclosed in a package of a badge case type, so that a person can secure the dosimeter on his clothing or the like.

The gamma- and beta-ray dosimeter block consists of a first dosimeter unit for measuring the dose of beta-rays comprising a first thermoluminescent element sensitive to gamma- and beta-rays, with a first filter for partially screening beta-rays disposed on the front side of said first element; a second dosimeter unit for measuring beta-ray energy comprising a second thermoluminescent element sensitive to gamma- and beta-rays, with a second filter disposed on the front side of said second element, said second filter being thicker than said first filter; a third dosimeter unit for measuring the dose of gamma-rays comprising a third thermoluminescent element sensitive to gamma-rays and having an energy response suitable for determining the depth dose equivalent index; and a fourth dosimeter unit for measuring gamma-ray energy comprising a fourth thermoluminescent element sensitive to gamma-rays.

The neutron dosimeter block consists of a fifth dosimeter unit for compensating a gamma-ray contribution in the determination of the neutron dose, said fifth unit comprising a fifth thermoluminescent element sensitive to gamma-rays with filters of cadmium disposed on both front and rear sides of said fifth element; a sixth dosimeter unit comprising a sixth thermoluminescent element sensitive to neutrons and gamma-rays with a filter of tin and a filter of cadmium disposed on the front and rear sides, respectively, of said sixth element; a seventh dosimeter unit comprising a seventh thermoluminescent element sensitive to neutrons and gamma-rays with filters of cadmium disposed on both front and rear sides of said seventh element; and a eighth dosimeter unit having the same construction as that of said sixth dosimeter unit but in the opposite arrangement of said tin and cadmium filters.

BRIEF DESCRIPTION OF THE DRAWINGS

By way of example and to make the description more clear, reference is made to the accompanying drawings in which:

FIG. 1 is a perspective view of an embodiment of the dosimeter according to this invention;

FIG. 2 is a perspective view of the dosimeter in an opened state;

FIG. 3 is a longitudinal sectional view of the dosimeter block for gamma- and beta-rays;

FIG. 4 is a longitudinal sectional view of the dosimeter block for neutrons; and FIG. 5 is an illustration of the interior mechanism of the dosimeter block for neutrons.

PREFERRED EMBODIMENT OF THE INVENTION

Referring now to FIGS. 1 and 2, a dosimeter package or a badge case 20 comprises a front cover 21 and a back cover 22 which are joined by hinges 23 so that the badge case may be opened or closed as desired. A clip 24 for securing the dosimeter to a person's clothing is provided on the rear surface of the back cover 22. A dosimeter block 11 for gamma- and beta-rays and another dosimeter block 12 for neutrons are enclosed in the badge case 20 arranged in a side-by-side standing relation as shown. Each of said blocks 11, 12 comprises a base plate 13 on which a plurality of dosimeter units are mounted, and a holder 14 in which the base plate 13 is fitted, as shown in FIGS. 3 and 4.

FIG. 3 shows the dosimeter block 11 for gamma- and beta-rays. This dosimeter block includes four dosimeter units. A first dosimeter unit for measuring the dose of beta-rays comprises a thermoluminescent element 1 sensitive to gamma- and beta-rays, with a first filter made of plastic (total thickness of 17 mg/cm$^2$) for partially screening beta-rays disposed on the front side (i.e. the radiation incident side, or the side away from a human body) of the element 1. A second dosimeter unit for measuring beta-ray energy comprises a thermoluminescent element 2 sensitive to gamma- and beta-rays, with a second filter made of plastic disposed on the front side of the element 2. The second plastic filter is slightly thicker (total thickness of 64 mg/cm$^2$) than the first plastic filter in the first dosimeter unit. A third dosimeter unit for measuring the dose of gamma-rays comprises a thermoluminescent element 3 sensitive to gamma-rays having an energy response suitable for determining the depth dose equivalent index. A fourth dosimeter unit for measuring gamma-ray energy comprises a thermoluminescent element 4 sensitive to gamma-rays. When a thermoluminescent material sensitive to both gamma- and beta-rays is employed in the elements 3 and 4, then it is required to dispose on the front side of each of the elements 3 and 4 a filter made of plastic having a sufficient thickness (total thickness of approximately 1000 mg/cm$^2$) to effectively shut out beta-rays.

The "total thickness" of the plastic filter disposed in front of each of the thermoluminescent elements 1 to 4 is the sum total of the thickness of the base plate 13, holder 14 and front cover 21 of the badge case 20. That is, the thickness acting as the first filter for element 1 is the total thickness of the base plate of 11 mg/cm$^2$, the holder of 3 mg/cm$^2$, and the badge case of 3 mg/cm$^2$; the second filter thickness for element 2 is the total thickness of the base plate of 11 mg/cm$^2$, the holder of 50 mg/cm$^2$, and the badge case of 3 mg/cm$^2$; and the filter thickness for each of the elements 3 and 4 is the total thickness of the base plate of 11 mg/cm$^2$, the holder of 160 mg/cm$^2$, and the badge case of 840 mg/cm$^2$.

The thermoluminescent elements 1, 2 and 3 may be made of, for example, $^7Li_2{}^{11}B_4O_7(Cu)$ powder which has a relatively flat energy response to low-energy gamma-rays, while $CaSO_4(Tm)$ powder may be employed as a material suited for the thermoluminescent element 4. Table 1 is a summary of the foregoing.

TABLE 1

| | Element No. | Thermoluminescent material | Plastic filter thickness (front side) |
|---|---|---|---|
| First dosimeter unit | 1 | $^7Li^{11}B_4O_7$ (Cu) | 17 mg/cm$^2$ |
| Second dosimeter Unit | 2 | $^7Li^{11}B_4O_7$ (Cu) | 64 mg/cm$^2$ |
| Third dosimeter unit | 3 | $^7Li^{11}B_4O_7$ (Cu) | about 1000 mg/cm$^2$ |
| Fourth dosimeter unit | 4 | $CaSO_4$ (Tm) | about 1000 mg/cm$^2$ |

FIG. 4 shows the neutron dosimeter block 12 which includes other four dosimeter units. A fifth dosimeter unit for compensating a gamma-ray contribution in the determination of the neutron dose comprises a thermoluminescent element 5 sensitive to gamma-rays with filters 15 made of cadmium disposed on both front and rear sides of the element 5. A sixth dosimeter unit comprises a thermoluminescent element 6 sensitive to thermal neutrons, epithermal neutrons and gamma-rays with a filter 16 made of tin and a filter 15 made of cadmium disposed on the front and rear sides, respectively, of the element 6. A seventh dosimeter unit comprises a thermoluminescent element 7 sensitive to thermal neutrons, epithermal neutrons and gamma-rays with filters 15 of cadmium disposed on both front and rear side of the element 7. A eighth dosimeter unit comprises a thermoluminescent element 8 sensitive to thermal neutrons, epithermal neutrons and gamma-rays with a filter 15 made of cadmium and a filter 16 made of tin disposed on the front and rear sides, respectively, of the element 8. This eighth dosimeter unit has, namely, the same construction as that of the sixth dosimeter unit but in the opposite arrangement of the tin and cadmium filters. In this embodiment, both the cadmium filter 15 and tin filter 16 have a thickness of 0.7 mm. As the material of these thermoluminescent elements, for example $^7Li_2{}^{11}B_4O_7(Cu)$ powder which is sensitive to gamma-rays alone and insensitive to neutrons may be used for the thermoluminescent element 5, while $^6Li_2{}^{10}B_4O_7(Cu)$ powder sensitive to gamma-rays, thermal neutrons and epithermal neutrons may be used for the thermoluminescent elements 6, 7 and 8. The foregoing is summarized in Table 2.

TABLE 2

| | Rear filter (on human body side) | Thermoluminescent material | Front filter (on incident side) |
|---|---|---|---|
| Fifth dosimeter unit | Cd | $^7Li_2{}^{11}B_4O_7$ (Cu) | Cd |
| Sixth dosimeter unit | Cd | $^6Li_2{}^{10}B_4O_7$ (Cu) | Sn |
| Seventh dosimeter unit | Cd | $^6Li_2{}^{10}B_4O_7$ (Cu) | Cd |
| Eighth dosimeter unit | Sn | $^6Li_2{}^{10}B_4O_7$ (Cu) | Cd |

In enclosing the neutron dosimeter block 12 in the badge case 20, the neutron dosimeter block is first covered around its periphery with 0.5 mm thick cadmium plates 17 onto which openings 18 are formed at the positions corresponding to the respective thermoluminescent elements 5, 6, 7 and 8, and is then disposed within the badge case 20, as shown in FIG. 5. Each of the openings 18 has an effective window area of 7×8 mm.

The methods for calculating the respective radiation doses and for obtaining energy information using the dosimeter of this invention will now be described hereinbelow. Calculation of the gamma-ray and beta-ray doses and their energy information are carried out using the gamma- and beta-ray dosimeter block 11. Separation of beta- and gamma-rays can be accomplished by using filter means having a thickness that can shut out the beta-rays alone. Here, the elements 1 and 2 are designed to be used for the measurement of beta-ray dose, and the elements 3 and 4 for the measurement of gamma-ray dose. Gamma-ray dose measured by the element 3 is used for gamma-ray subtraction in the determination of beta-ray dose.

When the thermoluminescence quantity of each thermoluminescent element is expressed by $T_i$ (i representing the element number 1–4), the relation between the gamma-ray dose ($D_\gamma$) and the beta-ray dose ($D_\beta$) is given by the following equations:

$$T_1 = b_1(E_\beta)D_{\beta2} + g_1(E_\gamma)D_\gamma \quad (1)$$

$$T_2 = b_2(E_\beta)D_\beta + g_2(E_\gamma)D_\gamma \quad (2)$$

$$T_3 = g_3(E_\gamma)D_\gamma \quad (3)$$

where $T_i$: thermoluminescene quantity of each element below each filter thickness, (counts)

$b_i(E_\beta)$: sensitivity of thermoluminescent element i to maximum beta-ray energy $E_\beta$ (MeV), (counts/rem)

$g_i(E_\gamma)$: sensitivity of thermoluminescent element i to gamma-ray energy $E_\gamma$ (MeV), (counts/rem)

$E_\beta$: maximum beta-ray energy, (MeV)

$E_\gamma$: effective gamma-ray energy, (MeV)

$D_\beta$: beta-ray dose, (rem)

$D_\gamma$: gamma-ray dose, (rem).

From equation (3), the following equation (4) is given:

$$D_\gamma = T_3/g_3(E_\gamma) \quad (4)$$

From equations (2) and (3), the following equations (5) and (6) are given:

$$D_{\beta 1} = \frac{T_1 - g_1(E_\gamma)D_\gamma}{b_1(E_\beta)} = \frac{T_1 - \left(\frac{g_1(E_\gamma)}{g_3(E_\gamma)}\right)T_3}{b_1(E_\beta)} \quad (5)$$

$$D_{\beta 2} = \frac{T_2 - g_2(E_\gamma)D_\gamma}{b_2(E_\beta)} = \frac{T_2 - \left(\frac{g_2(E_\gamma)}{g_3(E_\gamma)}\right)T_3}{b_2(E_\beta)} \quad (6)$$

Since $D_{\beta 1} = D_{\beta 2}$, the following equation (7) is given:

$$\frac{b_2(E_\beta)}{b_1(E_\beta)} = \frac{g_3(E_\gamma)T_2 - g_2(E_\gamma)T_3}{g_3(E_\gamma)T_1 - g_1(E_\gamma)T_3}(= EI_\beta) \quad (7)$$

As for the gamma-ray energy information, since it is known that the ratio of the thermoluminescence quantity of the element 3 to that of the element 4, $T_4/T_3$ ($=EI_\gamma$), is a function of the gamma-ray energy, this information can be obtained from that ratio if a pertinent relative formula has been previously determined. The gamma-ray dose can be obtained from equation (4). That is, since the right-hand term of equation (4) is the ratio of the thermoluminescence quantity $T_3$ of the element 3 to the gamma-ray sensitivity $g_3(E_\gamma)$ of the element 3, the gamma-ray dose can be calculated if the relation between the sensitivity ($g_3$) to gamma-rays and energy ($E_\gamma$) has been determined. The gamma-ray dose given from equation (4) is the depth dose equivalent index at a depth of 1000 mg/cm² beneath a skin of a human body. The beta-ray energy information is obtainable from equation (7). In equation (7), the right-hand term is expressed by a function of the thermoluminescence quantity $T_i$ of each element and its gamma-ray sensitivity $g_i(E_\gamma)$ alone, while the left-hand term is expressed as the ratio of the sensitivity $b_i(E_\beta)$ of each element to beta-rays alone. If the gamma-ray energy information is obtained in this manner, then the value of the right-hand term can be calculated because the gamma-ray sensitivity $g_i(E_\gamma)$ of each element can be treated as a constant and $T_i$ can be determined from actual measurement. This value is given as a function of the maximum beta-ray energy $E_\beta$ from the left-hand term, so that if a calibration curve between this ratio and $E_\beta$ has been previously determined, the maximum beta-energy can be estimated. Thus, equation (7) is an index ($EI_\beta$) indicating the beta-ray energy information. The thermoluminescent elements used in the embodiment exhibit, due to $^7Li_2{}^{11}B_4O_7(Cu)$, the uniform gamma-ray energy dependency over a wide range extending to a considerably low energy level, so that error in determining the value of gamma-ray energy sensitivity $g_i(E_\gamma)$ is minimized, providing a significant advantage in the estimation of beta-ray energy. The beta-ray dose can be calculated from equation (5) or (6).

The method for calculating the neutron information will now be described. The fifth to eighth dosimeter units in the neutron dosimeter block 12 are used to measure the neutron dose. This system is designed to be able to separately measure neutrons and gamma-rays utilizing the difference in sensitivity of $^6Li_2{}^{10}B_4O_7$ and $^7Li_2{}^{11}B_4O_7$ to thermal neutrons, and to be able to separately measure three groups of neutron energies (thermal neutrons $n_{th}$, epithermal neutrons $n_{ep}$, and fast neutrons $n_f$) utilizing the combinations of cadmium filters and tin filters as a filter material for measuring the neutron doses. Here, cadmium is used as a shielding material for thermal neutrons while tin is used as a material which is almost equivalent to cadmium in gamma-ray attenuation effect.

When the thermoluminescence quantity of each thermoluminescent element is expressed by $T_i$ (i representing the element number 5–8), $T_i$ is given as follows:

$$T_5 = \Gamma_\gamma D_\gamma + \Gamma_{\gamma c} D_{th} \quad (8)$$

$$T_6 = \Gamma_{th} D_{th} + (1 + b_{Bep})\Gamma_{ep}D_{ep} + c_{Bep}\Gamma_f D_f + \Gamma_\gamma D_\gamma + \Gamma_{\gamma c}D_{th} \quad (9)$$

$$T_7 = (1 + b_{Bep})\Gamma_{ep}D_{ep} + c_{Bep}\Gamma_f D_f + \Gamma_\gamma D_{65} + \Gamma_{\gamma c}D_{th} \quad (10)$$

$$T_8 = a_{Bth}\Gamma_{th}D_{th} + (1 + b_{Bth} + b_{Bep})\Gamma_{ep}D_{ep} + (c_{Bth} + c_{Bep})\Gamma_f D_f + \Gamma_\gamma D_\gamma + \Gamma_{\gamma c}D_{th} \quad (11)$$

where $T_i$: thermoluminescene quantity of each element, (counts)
$D_\gamma$: gamma-ray dose, (rem)
$D_\beta$: beta-ray dose, (rem)
$D_{th}$: thermal neutron dose, (rem)
$D_{ep}$: epithermal neutron dose, (rem)
$D_f$: fast neutron dose, (rem)
$\Gamma_\gamma$: transformation factor from thermoluminescence quantity to gamma dose, (counts/rem)
$\Gamma_f$: transformation factor from thermoluminescence quantity to fast neutron dose, (counts/rem)
$\Gamma_{ep}$: transformation factor from thermoluminescence quantity to epithermal neutron dose, (counts/rem)
$\Gamma_{th}$: transformation factor from thermoluminescence quantity to thermal neutron dose, (counts/rem)
$\Gamma_{\gamma c}$: transformation factor from thermoluminescence quantity to thermal neutron-capture gamma-ray dose, (counts/rem)
$a_{Bth}$: the rate at which incident thermal neutrons are back scattered by human body and reflected as thermal neutrons,
$b_{Bth}$: the rate at which the incident epithermal neutrons are back scattered by human body and reflected as thermal neutrons,
$b_{Bep}$: the rate at which the incident epithermal neutrons are back scattered by human body and reflected as epithermal neutrons,
$c_{Bth}$: the rate at which the incident fast neutrons are back scattered by human body and reflected as thermal neutrons.
$c_{Bep}$: the rate at which the incident fast neutrons are back scattered by human body and reflected as epithermal neutrons.

By subtracting equation (10) from equation (11), the following equation (12) is given:

$$T_8 - T_7 = a_{Bth}\Gamma_{th}D_{th} + b_{Bth}\Gamma_{ep}D_{ep} + c_{Bth}\Gamma_f D_f$$
$$= a_{Bth}(T_6 - T_7) + b_{Bth}\Gamma_{ep}D_{ep} + c_{Bth}\Gamma_f D_f \quad (12)$$

By subtracting equation (8) from equation (10), the following equation (13) is given:

$$T_7 - T_5 = (1 + b_{Bep})\Gamma_{ep}D_{ep} + c_{Bep}\Gamma_f D_f \quad (13)$$

-continued $$\Gamma_{ep}D_{ep} = \frac{1}{1+b_{Bep}}(T_7 - T_5 - c_{Bep}\Gamma_f D_f)$$

By substituting equation (13) into equation (12), the following equations (14) and (15) are given:

$$T_8 - T_7 = \tag{14}$$

$$a_{Bth}(T_6 - T_7) + \frac{b_{Bth}}{1+b_{Bep}}(T_7 - T_5 - c_{Bep}\Gamma_f D_f) + c_{Bth}\Gamma_f D_f$$

$$D_f = \frac{1}{\Gamma_f}\left(\frac{1+b_{Bep}}{c_{Bth}+b_{Bep}\cdot c_{Bth}-b_{Bth}\cdot c_{Bep}}\right) \times \tag{15}$$

$$\left\{(T_8 - T_7) - a_{Bth}(T_6 - T_7) - \frac{b_{Bth}}{1+b_{Bep}}(T_7 - T_5)\right\}$$

From equation (12) and (15), the following equation (16) is given:

$$D_{ep} = \frac{1}{\Gamma_{ep}}\left[\left\{\frac{1}{1+b_{Bep}} + \frac{b_{Bth}\cdot c_{Bth}}{1+b_{Bep}}\right.\right. \tag{16}$$

$$\left.\times \frac{1}{c_{Bth}+b_{Bep}\cdot c_{Bth}-b_{Bth}\cdot c_{Bep}}\right\} \times (T_7 - T_5)$$

$$-\frac{1}{c_{Bth}+b_{Bep}\cdot c_{Bth}-b_{Bth}\cdot c_{Bep}}$$

$$\left.\times \{(T_8 - T_7) - a_{Bth}(T_6 - T_7)\}\right]$$

From equations (9) and (10), the following equation (17) is given:

$$D_{th}=(1/\Gamma_{th})(T_6-T_7) \tag{17}$$

Thus, if the reflection rate of each group of neutrons has been determined, it is possible to calculate the respective neutron doses $D_f$, $D_{ep}$ and $D_{th}$ from the thermoluminescence quantity of each thermoluminescent element using the above equations (15), (16) and (17). The neutron dosimeter block 12, as stated above, is covered with a box-like shield 17 of cadmium having the windows or openings 18 at the positions corresponding to the respective dosimeter elements. Such construction prevents the incidence of neutrons from portions other than the windows and improves the accuracy of measurement.

While the mechanism for measuring respective radiation doses with the dosimeter according to this invention has been described, it should be understood that the various other advantageous features are incorporated in the above-described embodiment of this invention. The badge case 20 is designed so that once it is closed by bringing its front cover 21 and back cover 22 into their closing positions, it is automatically locked by a locking mechanism and cannot be easily opened unless a proper unlocking means is applied. Also, as seen from FIG. 5, a rubber packing 30 is secured to the outer wall of the back cover 22 to keep water or moisture out. A unique structural contrivance is also incorporated so that a person assembling it will not make a mistake in properly setting the two dosimeter blocks 11 and 12 in the badge case. Further, a space is provided in the badge case 20 to permit installation of indium tips or, if necessary, back-up elements in addition to these two dosimeter blocks. Each of the dosimeter blocks 11, 12 is provided with an optically readable punched code unit 31 alongside the holder 14 so that the personal badge number, dosimeter classification code, etc., can be automatically read out by a measuring device. When the base plate 13 having the dosimeter elements mounted thereon is once inserted into the holder 14, the base plate 13 is mechanically locked with the holder 14. Such mechanical locking construction prevents casual removal of the element by a user of the dosimeter and also excludes any possibility of erroneous measurement due to dust, light or the like.

The complex personal dosimeter of this invention having the construction described hereinbefore enables measurement or estimation of the radiation doses received by a human body such as gamma-rays, beta-rays, thermal neutrons, epithermal neutrons and fast neutrons with higher accuracy and more rapidly than is possible with the conventional personal dosimeters of the same type. Also, the dosimeter of this invention makes it possible to obtain information regarding the energy of radiation to which a person has been exposed. Thus, the present invention provides excellent practical effects for the management of personal radiation exposure on many workers in a large factory.

It is understood by those skilled in the art that the foregoing description is a preferred embodiment of the disclosed instrument and that various changes and modifications may be made in the invention without departing from the spirit and scope thereof.

What is claimed:

1. A complex personal dosimeter including a gamma- and beta-ray dosimeter block and a neutron dosimeter block, these two blocks being enclosed in a package of a badge case type, said gamma- and beta-ray dosimeter block consisting of:
   a first dosimeter unit for measuring the dose of beta-rays comprising a first thermoluminescent element sensitive to gamma- and beta-rays, with a first filter for partially screening beta-rays disposed on the front side of said first element;
   a second dosimeter unit for measuring beta-ray energy comprising a second thermoluminescent element sensitive to gamma- and beta-rays, with a second filter disposed on the front side of said second element, said second filter being thicker than said first filter;
   a third dosimeter unit for measuring the dose of gamma-rays comprising a third thermoluminescent element sensitive to gamma-rays and having an energy response suitable for determining the depth dose equivalent index; and
   a fourth dosimeter unit for measuring gamma-ray energy comprising a fourth thermoluminescent element sensitive to gamma-rays;
said neutron dosimeter block consisting of:
   a fifth dosimeter unit for compensating a gamma-ray contribution in the determination of the neutron dose, said fifth unit comprising a fifth thermoluminescent element sensitive to gamma-rays with filters of cadmium disposed on both front and rear sides of said fifth element;
   a sixth dosimeter unit comprising a sixth thermoluminescent element sensitive to neutrons and gamma-rays with a filter of tin and a filter of cadmium disposed on the front and rear sides, respectively, of said sixth element;

a seventh dosimeter unit comprising a seventh thermoluminescent element sensitive to neutrons and gamma-rays with filters of cadmium disposed on both front and rear sides of said seventh element; and a eighth dosimeter unit having the same construction as that of said sixth dosimeter unit but in the opposite arrangement of said tin and cadmium filters.

2. The complex personal dosimeter according to claim 1, wherein said first and second filters disposed in said first and second dosimeter units are made of plastic.

3. The complex personal dosimeter according to claim 1, wherein said third and fourth thermoluminescent elements comprise a thermoluminescent material sensitive to gamma- and beta-rays, and a filter for shutting out beta rays is disposed on the front side of each of said third and fourth element.

4. The complex personal dosimeter according to claim 3, wherein said filter for shutting out beta rays is made of plastic.

5. The complex personal dosimeter according to claim 1, wherein said neutron dosimeter block is covered with a box-like shield of cadmium, said box-like shield having openings formed at the positions corresponding to said fifth, sixth, seventh and eighth elements.

6. The complex personal dosimeter according to claim 1, wherein said badge case type package comprises a front cover and a back cover which are joined by hinge means, and a clip for securing the dosimeter to a person's clothing is provided on the rear surface of said back cover.

7. The complex personal dosimeter according to claim 1, wherein each of said gamma- and beta-ray dosimeter block and said neutron dosimeter block comprises a separate member, and these two separate blocks are enclosed in said package arranged in a side-by-side standing relation.

8. The complex personal dosimeter according to claim 1, wherein said first, second and third thermoluminescent elements are made of $^7Li_2^{11}B_4O_7(Cu)$ powder.

9. The complex personal dosimeter according to claim 1, wherein said fourth thermoluminescent element is made of $CaSO_4(Tm)$ powder.

10. The complex personal dosimeter according to claim 1, wherein said fifth thermoluminescent element is made of $^7Li_2^{11}B_4O_7(Cu)$ powder.

11. The complex personal dosimeter according to claim 1, wherein said sixth, seventh and eighth thermoluminescent elements are made of $^6Li_2^{10}B_4O_7(Cu)$ powder.

* * * * *